United States Patent [19]
Weiss et al.

[11] 3,839,199
[45] Oct. 1, 1974

[54] METHOD OF SOFTENING WATER TO PROVIDE EASILY DRAINED AND EASILY FILTERED PRECIPITATES

[75] Inventors: Charles O. Weiss, Princeton; Arthur Charles Epstein, Somerset, both of N.J.

[73] Assignee: The Permutit Company, Inc., Paramus, N.J.

[22] Filed: Jan. 9, 1974

[21] Appl. No.: 431,883

Related U.S. Application Data

[63] Continuation of Ser. No. 244,029, April 14, 1972, abandoned.

[52] U.S. Cl. .................. 210/20, 210/46, 210/51
[51] Int. Cl. .................................... C02b 1/22
[58] Field of Search ............. 210/42, 43, 45, 46, 47, 210/51, 53, 20

[56] References Cited
UNITED STATES PATENTS
2,259,717   10/1941   Zentner .............................. 210/51
3,087,889   4/1963    Govdrian ............................ 210/46

Primary Examiner—Charles N. Hart
Assistant Examiner—Benoit Castel
Attorney, Agent, or Firm—Theodore B. Roessel; James A. Rich

[57] ABSTRACT

Water having calcium and magnesium hardness is first treated with an excess of softening chemical sufficient to raise the pH of the water to at least 11.0 in an inverted, frusto-conical tank containing a granular contact material to remove calcium and magnesium hardness. The water containing the excess of softening chemical is then treated with a sufficient amount of precipitating agent to reduce the pH of the softened water to a range from about 9.8 to about 10.2 in a second inverted, frusto-conical tank containing a granular contact material to remove the excess softening chemical. Any solid magnesium hardness precipitate which passes from the first tank into the second tank, is solubilized in the second tank. Solid particles escaping from the dual tank system are easily filtered, and sludges which are not easily filtered, have been eliminated by the process.

12 Claims, 1 Drawing Figure

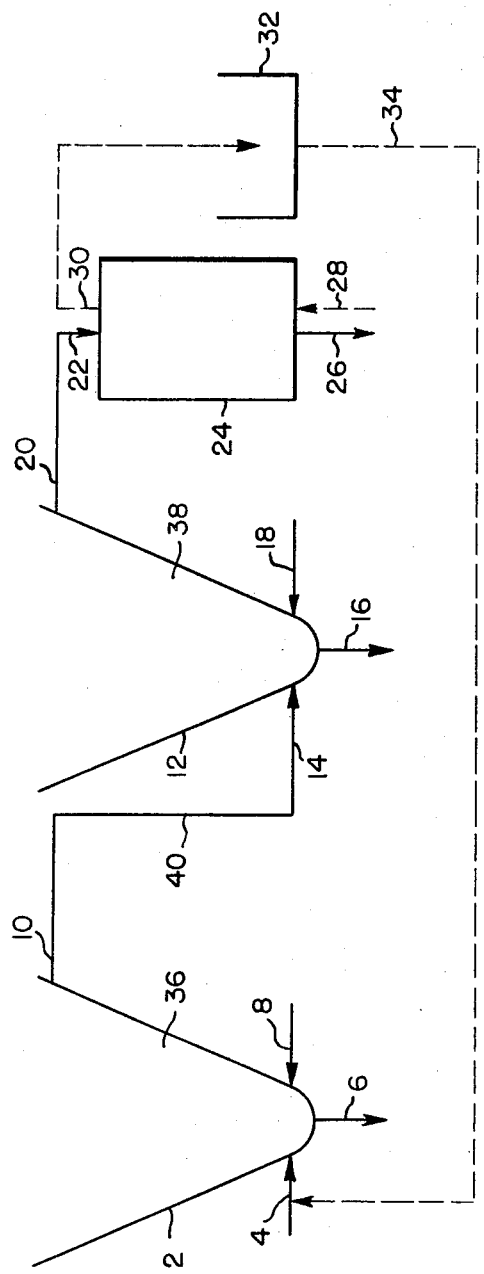

METHOD OF SOFTENING WATER TO PROVIDE EASILY DRAINED AND EASILY FILTERED PRECIPITATES

CROSS REFERENCES TO RELATED APPLICATIONS

This is a xx continuation, of application Ser. No. 244,029, filed Apr. 14, 1972, now abandoned.

BACKGROUND OF THE INVENTION

This invention relates to improvements in or relating to the softening of water, and more particularly, to a process for producing easily drained and easily filtered precipitates formed during the softening of hard water with chemical agents.

One type of process used to soften water comprises treating raw water with chemicals to precipitate the hardness ions therefrom. The hardness ions are generally calcium and magnesium. Silica, iron, aluminum, manganese, free carbon dioxide and other impurities, including turbidity and some types of color, may also be removed in whole or in part from the water during the softening process. When the hardness ions are removed by the action of chemical agents upon the raw water, a voluminous wet sludge which contains a solids content generally between 2-10 percent (by weight) with the remainder water, is formed. This wet sludge has a consistency similar to that of a creamed soup and is difficult to dispose of because it usually must be lagooned and dewatered or otherwise dried prior to disposal. When the water being softened contains both calcium and magnesium hardness, the sludge is generally composed primarily of calcium carbonate and magnesium hydroxide, and this sludge is generally discarded from a variety of precipitators and clarifiers which are presently used in the art of softening water.

Another type of water softening system is the inverted, frusto-conical tank wherein raw water is treated with softening chemicals in the presence of inert, granular contact materials as disclosed by Zenter in U.S. Pat. No. 2,259,717. Calcium hardness and minor amounts of magnesium hardness are precipitated from the water in this system and a calcium-depleted water effluent flows from the system. The precipitated calcium hardness and the granular contact material are removed in the form of a pebble-like mass consisting of about 80 percent solids. In the inverted frusto-conical tank the softening chemicals are metered into the bottom periphery of the device, and precipitation takes place directly on the granular contact material. As the granular contact material increases in volume due to the solids growth thereon, it automatically classifies itself, and the larger particles fall to the bottom of the device where they are periodically removed through a blowdown outlet in the bottom of the frusto-conical tank.

The inverted, frusto-conical water softener is ideal for treating calcium containing raw water with lime or lime-soda ash chemical agents. However, the effluent from the Zentner water softener contains fine precipitates which must be removed before the softened water can be used. For magnesium rich raw waters this effluent treated water issuing from the inverted, frusto-conical tank cannot be satisfactorily polish filtered due to the fact that the precipitates therein cause rapid plugging and clumping of conventional filter systems. This results in short filter runs and the inability to backwash the filter. But when the filters are eliminated, the effluent contains precipitate in the form of turbidity. In these cases, the inverted, frusto-conical tank must be followed by a precipitator or clarifier for settling out the insoluble precipitates formed by the reaction of lime and hardness ions. Since the inverted, frusto-conical tank has been used in conjunction with the precipitator or clarifier, the volume of sludge ordinarily encountered as compared to precipitation treatment alone, has been reduced, however, the remaining sludge separated in the precipitator or clarifier still constitutes a sludge-handling problem, especially in view of the fact that clean water legislation now prevents the dumping of this type of waste sludge into water ways, streams, lakes and the like. Where installations are provided for dewatering and/or hauling of the sludge, costs of these handling methods have been found to be excessive.

OBJECTS OF THE INVENTION

Accordingly, it is an object of this invention to provide a process for the elimination of sludge produced in the softening of water.

It is another object of this invention to provide a process for the softening of water wherein both the calcium and magnesium hardness removed from the water in the form of precipitates along with other insoluble materials can be easily handled and disposed.

It is another object of this invention to provide a process wherein water having high concentrations of magnesium hardness can be softened with chemical agents and thereby produce precipitates which are easily drained and easily filtered and can be economically handled.

Still another object of this invention is to provide a process wherein precipitates formed by the reaction of hardness ions in water and chemical softening agents can be satisfactorily polished in conventional filter systems when the water undergoing treatment has high magnesium content.

Other objects and advantages of this invention will become apparent from the following detailed description taken in connection with the accompanying drawing.

SUMMARY OF THE INVENTION

According to the present invention sludge production in the chemical softening of water, especially water having a high magnesium content, has been essentially eliminated by first treating the raw water with an excess of softening chemical, such as, lime, in a first vertical, elongated chamber containing a granular contact material followed by treatment of the effluent water from the first vertical, elongated chamber with a precipitating agent in a second vertical, elongated chamber containing a granular contact material. The effluent from the second vertical, elongated chamber is then filtered in a conventional filter system, with no observable plugging of the filter system during the service period. The filter can be backwashed to remove the solid particles collected in the filter device.

The control of pH in the first and second vertical, elongated chambers is critical, and the pH is controlled therein by control of the amount of softening chemical and precipitating agent admitted to the respective chambers. The pH of the raw water in the first vertical, elongated chamber must be adjusted to such a level that the raw water effluent thereof has a pH of about 11.0 or higher. The pH in the second vertical elongated chamber must be adjusted to such a level that the effluent thereof has a pH of about 9.8 to about 10.2. The precipitates removed from the vertical, elongated chambers have a consistency similar to large sand granules or small pebbles and can be easily handled. Precipitates removed by the filter can be recycled into the vertical elongated chambers as granular contact material, or they can be converted to water-soluble calcium and magnesium compounds and recycled into the first elongated chamber where they are precipitated on granular contact material. This can be affected with an inorganic acid, such as, hydrochloric acid, or with carbon dioxide.

In accordance with the present invention "softening water" or "softening raw water containing calcium and magnesium hardness" is defined as the removal of calcium hardness, magnesium hardness and the like, and a softened water is a water in which the hardness ion concentrations have been substantially reduced.

Chemical softening agent as used herein is any agent which will cause the precipitation of the calcium and magnesium ions from water and is preferably a concentrated aqueous solution of lime or lime-soda ash. As used herein precipitating agent is any chemical agent which will cause the precipitation of the chemical softening agent in an aqueous solution or medium and is preferably carbon dioxide gas.

BRIEF DESCRIPTION OF THE DRAWING

The drawing is a schematic representation of a first inverted, frusto-conical tank, a second inverted, frusto-conical tank and a conventional filter device communicating in series.

DESCRIPTION OF THE PREFERRED EMBODIMENTS

In the drawing a first inverted, frusto-conical tank 2 communicates with a second inverted, frusto-conical tank 12 by a suitable conduit 40. In tank 2 there is tangential raw water inlet 4, a chemical softening agent inlet 8, and blowdown outlet 6, located near the bottom (apex) of the tank. Mixing and precipitation zone 36 is within tank 2 and a hardness-depleted water outlet 10 is located near the top of tank 2. In second inverted, frusto-conical tank 12, there is a hardness-depleted water inlet 14 near the apex of tank 12 communicating with hardness depleted water outlet 10 by means of a suitable conduit 40. Blowdown outlet 16 and precipitating agent inlet or carbon dioxide gas inlet 18 are located near the bottom of tank 12. Mixing and precipitation zone 38 is inside tank 12, and softened water outlet 20 is located near the top of tank 12. Hardness-depleted water inlet 14 and raw water inlet 4 are located at or near the apex of the tanks and form a tangential angle with the interior surface of tanks 12 and 2 respectively. The inverted, frusto-conical water softener units designated by numerals 2 and 12 suitable for use in this process, are the type disclosed in U.S. Pat. No. 2,259,717.

In the process of the present invention raw water containing calcium and magnesium hardness entering first inverted, frusto-conical tank 2 at or near the apex thereof via raw water inlet 4 is treated with at least one chemical softening agent which is injected into the tank at chemical softening agent inlet 8. As the water enters the tank through the tangential inlet near the apex of the tank, the raw water and chemical softening agent are mixed and pass at a high rate of flow through a bed of granular contact material (not shown) maintained partially or completely in suspension by the motion or turbulence of the water being treated in mixing and precipitation zone 36. The suspended granular bed provides precipitation sites for the reaction between the chemical softening agent fed into the system and those species, such as, calcium, magnesium and bicarbonate ions, in the raw water imparting hardness thereto. Solid reaction projects or precipitates tend to form or plate out on the catalyst granules in the area of mixing and precipitation zone 36. As the precipitate plates out on the granular contact material, the granules gradually increase in size, and when they have grown so large as to have diminished catalytic effectiveness, they are discharged at precipitate blowdown outlet 6. This precipitate which represents calcium hardness and magnesium hardness precipitated in the form of insoluble calcium and magnesium compounds, is in the form of easily-drained pellets and/or sand-like materials.

The amount of chemical softening agent admitted at chemical softening agent inlet 8 must be sufficient to raise the pH of the raw water to at least about 11.0. At this pH, there is sufficient chemical softening agent to precipitate not only the calcium hardness in the raw water but also the magnesium hardness therein. Thus, as used herein a sufficient amount of chemical softening agent is defined as that amount of chemical softening agent, preferably lime (calcium hydroxide), which will raise the pH of the raw water in tank 2 to at least about 11.0. When an amount of lime sufficient to raise the pH of the raw water in tank 2 to at least about 11.0, has been added, there is an excess of lime (calcium hydroxide) both dissolved and suspended in the water. As the precipitate comprising the calcium and magnesium hardness plated out on the granular contact material remains in tank 2 with the granular contact material, the water from which the calcium and magnesium hardness has been removed, passes from tank 2 at water outlet 10 and is designated herein as hardness-depleted water.

The hardness-depleted water which contains the excess of lime, that is, the excess lime which did not react with calcium and magnesium hardness in the raw water, passes from hardness-depleted water outlet 10 to hardness-depleted water inlet 14. Although it is not shown, and unless the first inverted, frusto-conical tank is pressurized, it is preferred that a repumping tank and suitable pumping means be incorporated within conduit 40 to provide force or pressure to the water entering second inverted, frusto-conical tank 12 through tangential inlet 14. The hardness-depleted water containing excess or unreacted lime is mixed with carbon dioxide gas injected into tank 12 at precipitating agent inlet 18, and the mixture of hardness-depleted water and carbon dioxide gas pass at a high rate of flow through the bed of granular contact material which is maintained partially or completely in suspension by the motion or turbulence of the water being treated. This forms a fluidized bed. The suspended granular bed in tank 12 provides precipitation sites for the reaction between the carbon dioxide fed into the system at inlet 18 and the excess chemical softening agent (calcium hydroxide) in the hardness-depleted water. A solid reaction product (precipitate) of calcium carbonate forms or plates out on the granular contact material in the area of mixing and precipitation zone 38. As the precipitate plates out on the granular contact material, the granules gradually increase in size, and when they have grown so large as to have diminished catalytic effectiveness, they are discharged at precipitate blowdown outlet 16. This precipitate passes from blowdown outlet 16 in the form of pellets or sand-like material from which the fluid medium is easily drained.

The softened water, that is, water from which the magnesium and calcium hardness and the excess calcium hydroxide have been removed, passes as an effluent from tank 12 at softened water outlet 20.

The amount of carbon dioxide gas or other suitable precipitating agent injected into the hardness-depleted water in tank 12 at precipitating agent inlet 18 must be an amount sufficient to decrease the pH of the hardness-depleted water having excess lime from a pH of at least about 11.0 to a pH no higher than about 10.2 and no lower than about 9.8. Accordingly, it is critical to maintain the level of carbon dioxide injection into tank 12 to provide a pH of the fluid medium therein from about 9.8 to about 10.2. The precipitation of the excess calcium hydroxide will occur in tank 12 when the pH is maintained between about 9.8 and about 10.2 therein. Accordingly, by a sufficient amount of precipitating agent or carbon dioxide gas is meant that amount of precipitating agent or carbon dioxide gas which will reduce the pH of the hardness-depleted water from a pH of at least about 11.0 to a pH within the range of about 9.8 to about 10.2.

Water passing from second inverted, frusto-conical tank as effluent from softened water outlet 20 contains precipitate formed from the reaction in tank 12 in addition to any solids initially contained in the raw water (turbidity) as well as precipitated calcium and magnesium hardness which did not adhere to the catalyst in the first tank. We have found that this precipitate, and turbidity when present, is filterable and does not clog conventional filtering devices designated by numeral 24 through which the water is passed to remove the precipitate. The effluent water from outlet 20 enters filter device 24 at filter inlet 22; the precipitate is filtered from the stream of water therein; and the water passes to service or to storage at filter outlet 26. Since the precipitate collected in filter device 24 does not clog the filter, we have found that the filter may be backwashed to remove collected precipitate as shown by dotted lines 28 and 30. Water is passed in a reverse direction in line 28 through the filter to remove the collected precipitate particles, and turbidity when present, and passes by means of conduit 30 into a suitable backwash recycle tank where it can be subjected to further treatment. As shown in the drawing the backwash precipitate passes by suitable means indicated by dotted line 34 into raw water inlet 4. The backwashed collected precipitate from the filter is passed directly to raw water inlet 4 without additional treatment, and the solids therein are injected into the fluidized bed of the first inverted frusto-conical tank where they act as granular contact material. Although it is not shown the precipitated solids can also be passed into the second inverted frusto-conical tank where they will enter the fluidized bed to act as granular contact material. As the granular contact material increases in size and is removed from the respective tanks, the collected precipitate acts as replacement granular contact material for the operation.

In another embodiment (not shown) the backwashed collected precipitate in backwash recycle tank 32 is converted to calcium bicarbonate by treatment with carbon dioxide gas and is passed by a suitable conduit into raw water inlet 4 where the calcium bicarbonate which is water soluble, is precipitated by the chemical softening agent in the first inverted frusto-conical tank 2. In another embodiment the backwashed collected precipitate held in backwash recycle tank 32 can be neutralized with a suitable inorganic acid, such as, hydrochloric acid, sulfuric acid, phosphoric acid, or nitric acid, and the like and fed to the first tank where it is removed as carbonate hardness. By a sufficient amount of inorganic acid as used herein we mean that amount of inorganic acid which will neutralize the precipitate contained in the backwash.

In the process of the present invention when milk of lime (a concentrated aqueous suspension of calcium hydroxide having a pH of about 12.5) is used as the chemical softening agent, and an amount of the milk of lime sufficient to maintain the effluent pH of the first inverted frusto-conical tank at about 11.0 is used, the calcium and magnesium hardness are precipitated in the first inverted frusto-conical tank generally as calcium carbonate and magnesium hydroxide. The effluent of the first tank (pH of at least about 11.0) contains excess lime (calcium hydroxide) and is treated with carbon dioxide gas in the second inverted frusto-conical tank to produce calcium carbonate precipitate. The quantity of carbon dioxide gas used in the second inverted frusto-conical tank is governed by the effluent pH of the second tank which should be between about 9.8 and about 10.2. Under these conditions the calcium and magnesium associated with the raw water are removed in the first frusto-conical tank while the calcium associated with the excess lime addition is removed in the second frusto-conical tank. The pH of at least about 11.0 in the first tank results in maximum formation of insoluble magnesium compounds therein. Any solid magnesium compound which escapes the first tank is essentially converted to water-soluble magnesium carbonate/bicarbonate by the carbon dioxide in the second tank. Accordingly, transfer of insoluble magnesium compounds to, or the formation of insoluble magnesium compounds in, the filter medium has been substantially eliminated. In addition, the precipitate which passes from tank 12, is easily filterable on conventional filter devices. Thus, by providing for the treatment of the water in the dual inverted frusto-conical tank system with the tanks connected in series, we have found that both calcium and magnesium hardness can be easily removed and that the effluent water is easily filtered in conventional filter systems.

Iron, silica, aluminum and manganese as well as turbidity, certain types of color and other impurities are also removed during the process of the present invention. Solid particles and solid impurities remaining in the softened water are removed when the water passes through the conventional filter system, and the solid particles are removed from the filter during the backwash cycle.

The solid material removed from the first and second tanks, that is, the pellets or sand-like material removed from the blowdown outlets of the respective tanks, contains at least about 75 percent by weight) or higher solids which drain quickly due to the nature of the pellets or granules. The resultant material after draining, is approximately 95 percent solids by weight. In its almost dry condition the granules or pellets are easily handled in a manner similar to sand.

Although the inverted frusto-conical tanks having order to maintain the pH of the first inverted frusto-conical tank at about 11.0–11.5. Carbon dioxide was admitted to second inverted frusto-conical tank at about 10 cubic feet per hour to maintain the pH of the water in the second tank at 9.8 to 10.2. The results are shown in Table I below.

TABLE I

| Example | | Influent (ppm $CaCO_3$) | Effluent I (ppm $CaCO_3$) | pH | Effluent II (ppm $CaCO_3$) | pH |
|---|---|---|---|---|---|---|
| 1 | Total Hard. | 208 | 238 | | 104 | |
| | Ca Hard. | 168 | 238 | 11.3 | 96 | 9.8 |
| | Mg. Hard. | 40 | 0 | | 8 | |
| 2 | Total Hard. | 228 | 164 | | 120 | |
| | Ca Hard. | 114 | 64 | 11.0 | 32 | 9.8 |
| | Mg. Hard. | 114 | 100 | | 88 | |
| 3 | Total Hard. | 192 | 140 | | 86 | |
| | Ca Hard. | 138 | 108 | 11.7 | 60 | 9.7 |
| | Mg. Hard. | 54 | 32 | | 26 | |
| 4 | Total Hard. | 212 | 244 | | 102 | |
| | Ca Hard. | 150 | 240 | 11.4 | 86 | 9.8 |
| | Mg. Hard. | 62 | 4 | | 16 | | tangential water inlets are preferred for the process of the present invention, any vertically oriented, elongated chamber in which a fluidized bed of granular contact material, water being treated, and chemical softening agent or precipitating agent can be maintained, and in which the precipitating particles being formed can plate out on the granular contact material, may be utilized in the practice of the present invention. A fluidized bed is a body of granular contact material and/or other solids suspended in a fluid medium. The granular contact material may be any inert solid particle such as sand, pulverized calcium carbonate, and the like.

Suitable conduits, pumping means, tanks such as storage tanks, repumping tanks and flow-balancing tanks, flow meters, gauges, valves, vents, lids, filter beds, and the like (not shown) can be used in the apparatus to carry out the process of the present invention and can easily be incorporated therein by one skilled in the art. Conventional filter beds include sand, anthracite, activated carbon, and the like, and mixtures thereof. Flow rates can be manipulated and controlled by one skilled in the art as long as the critical pH balance is maintained in the dual-tank water softening system.

The following specific examples illustrate more clearly the exact manner in which the process of the present invention can be carried out, although the invention is not to be construed as limited in its scope thereby.

EXAMPLES

A water softening system for carrying out the process of the present invention was set up in accordance with the embodiment shown in the accompanying drawing. The first and second inverted, frusto-conical tanks each had a capacity of 20 gallons per minute. A flow-balancing tank and pumping means were incorporated in conduit 40 for maintaining even flow of the fluid medium and for providing added force for the entry of the fluid medium from the flow-balancing tank into water inlet 14. Raw water was passed into the first inverted, frusto-conical tank at about 15 gallons per minute (gpm). Milk of lime (calcium hydroxide) in an aqueous medium was admitted to the first inverted frusto-conical tank at approximately 1.5 pounds per hour in All hardness in the examples and Table I is expressed as parts per million (ppm) calcium carbonate. Influent water is the raw water before treatment. Effluent I is the effluent water (hardness-depleted water) from the first inverted frusto-conical tank and Effluent II is the effluent water (softened water) from the second inverted frusto-conical tank. The pH shown is the pH of the effluent from the respective tanks and represents generally the pH of the mixing and precipitation zones inside the tanks. Total hardness, calcium hardness and magnesium hardness is shown at each stage.

An examination of the data in Table I for examples 1–4 indicates that when the proper pH levels are maintained in accordance with the process of the present invention, magnesium hardness and calcium hardness are substantially reduced, and magnesium hardness in certain cases is eliminated from the water. In Example 1, magnesium hardness is shown in Effluent II and is absent in Effluent I. This variation is due to precision of the analytical method (titration procedure) and is within the limits of experimental error. In example 4 the difference in magnesium hardness between Effluent I and Effluent II is within the limits of experimental error. Calcium hardness is higher in Effluent I in certain cases than in the influent water, for example, in Example 4 where the calcium hardness is 240 ppm in Effluent I and 150 ppm in Influent water. The increase in calcium hardness is due to the excess calcium hydroxide in the water resulting from the injection of an excess of milk of lime into the first inverted frusto-conical tank. When the excess calcium hydroxide is removed by the action of carbon dioxide gas in second frusto-conical tank the effluent from the second tank reflects this removal, for example, the calcium hardness in Example 4 has been reduced to 86 ppm in the second frusto-conical tank. In all cases pellet-like granules were removed from the blowdown outlets in the first and second frusto-conical tanks. The softened water passing as an effluent from the second frusto-conical tank filtered with extreme ease, and no clogging of the filter media was observed. The filter media could be easily backwashed after removal of the precipitates from the softened water.

EXAMPLE 5

This process was carried out in accordance with the procedure outlined for Examples 1–4 above. The magnesium hardness of the influent raw water was 88 ppm. Milk of lime was added to the first inverted frusto-conical tank at a rate sufficient to increase the pH of the raw water to only 10.6. The tank discharge (effluent) from the first tank was then passed through the second tank with no additional chemical treatment. This experiment simulated the conditions of doubling the residence time maintained at a pH of 10.6. The magnesium hardness of Effluent I was measured at 86 ppm and the magnesium hardness of Effluent II was measured at 72 ppm. Although it is within the limits of experimental error, at most only 14 ppm of magnesium hardness was removed at these pH levels, indicating that the pH levels of the fluid media of the first and second inverted frusto-conical tanks is critical, i.e., magnesium is removed at a pH of about 11.0 but it is not removed at a pH of 10.6 even with a two fold increase in detention time. The pH, therefore, must be within the limits set forth in accordance with the process of the present invention as disclosed above.

In accordance with the objects of the present invention we have provided a method of softening water, and particularly of softening a high magnesium water, and sludge accumulations have been eliminated. The filtered precipitates collected in the filter from the softened water in accordance with the present invention can be easily backwashed and recycled without loss or destruction of the filter media. The elimination of sludge and the production of easily drained and easily filtered precipitates has been made possible by the process of the present invention carried out in an apparatus comprising first and second inverted frusto-conical tanks connected in series.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiments shown and described but is to be interpreted as broadly as permitted by the appended claims.

We claim:

1. A process of softening water containing calcium and magnesium hardness, at least 20% of said hardness being magnesium hardness, comprising:
   a. treating the water with an excess of calcium hydroxide sufficient to raise and maintain the pH of said water to at least 11.0 and passing the water up through a fluidized bed of granular contact material in a first vertical, elongated chamber to remove calcium and magnesium hardness and form a water containing an excess of calcium hydroxide; and
   b. treating the water containing the excess of calcium hydroxide with a sufficient amount of precipitating agent to reduce and maintain the pH of said water to a range from about 9.8 to about 10.2 and passing the water up through a fluidized bed of granular contact material in a second vertical, elongated chamber to precipitate the excess of calcium hydroxide and form a softened water effluent; and,
   c. filtering the softened water effluent to remove any precipitate carried out of the second vertical, elongated chamber with the softened water.

2. A process in accordance with claim 1 wherein the water is treated with an aqueous solution of calcium hydroxide in the first chamber.

3. A process in accordance with claim 1 wherein the water is treated with a lime-soda solution in the first chamber.

4. A process in accordance with claim 1 wherein said precipitating agent is carbon dioxide.

5. A process in accordance with claim 1 further comprising passing the precipitate recovered by filtering, into the vertical elongated chambers to provide a source of granular contact material in the fluidized bed of said chamber.

6. A process in accordance with claim 1 further comprising treating the precipitate recovered by filtering, with carbon dioxide to form water-soluble calcium bicarbonate and passing said calcium bicarbonate into the first vertical elongated chamber where it is precipitated on granular contact material by the calcium hydroxide.

7. A process in accordance with claim 1 further comprising treating the precipitate recovered by filtering, with a sufficient amount of an inorganic acid to neutralize the precipitate and returning said neutralized solution to said first vertical elongated chamber.

8. A process in accordance with claim 7 wherein the inorganic acid is selected from the group consisting of hydrochloric acid, nitric acid, sulfuric acid and phosphoric acid.

9. A process of softening raw water containing calcium and magnesium hardness with chemical agents to provide easily drained and filterable precipitates, in an apparatus comprising a first inverted, frusto-conical tank having at least one tangential raw water inlet, a chemical inlet and a blowdown outlet near the bottom of said tank and a water outlet near the top of said tank; a second inverted frusto-conical tank having at least one tangential treated water inlet, a gas inlet and blowdown outlet near the bottom of said tank and a water outlet near the top of said tank, the treated water inlet of said second tank communicating with the water outlet of said first tank; and a filter the inlet of which communicates with the water outlet of said second tank and the outlet of which passes to service, which process comprises:
   a. feeding raw water containing calcium and magnesium hardness, at least 20 percent of said hardness being magnesium hardness, into said first inverted, frusto-conical tank;
   b. feeding an amount of chemical softening agent selected from the group consisting of lime and lime-soda ash sufficient to raise and maintain the pH of said raw water to at least 11.0 in said chemical inlet;
   c. passing said raw water and chemical softening agent in a turbulent flow pattern in said first frusto-conical tank in the presence of granular contact material suspended in said raw water by the turbulent flow pattern to mix said raw water, chemical softening agent and granular contact material and thereby form a precipitate from the calcium and magnesium hardness and a hardness-depleted water containing excess chemical softening agent;
   d. passing the hardness-depleted water containing excess chemical softening agent from the water outlet of said first tank and feeding said hardness-depleted water into said second tank;

e. feeding a sufficient amount of carbon dioxide to reduce and maintain the pH of the hardness-depleted water to a range from about 9.8 to about 10.2 into said gas inlet of said second tank;

f. passing said hardness-depleted water and carbon dioxide in a turbulent flow pattern in said second frusto-conical tank in the presence of granular contact material suspended in said water by the turbulent flow pattern to mix said hardness-depleted water, carbon dioxide and granular contact material and thereby form a precipitate from the excess chemical softening agent in said hardness-depleted water said precipitate forming on said granular contact material, and a softened water; and g. passing the softened water from the water outlet of said second tank to said filter to remove solid particles carried with the softened water from said second tank whereby the easily filtered precipitate carried out of said second tank is removed from the softened water by said filter and an easily drained precipitate adhering to the granular contact material in the first and second frusto-conical tanks is removed from the respective blowdown outlets in said tanks.

10. A process in accordance with claim 9 further comprising passing the precipitate recovered by filtering into the inverted, frusto-conical tanks to provide a source of granular contact material.

11. A process in accordance with claim 9 further comprising treating the precipitate recovered by filtering with carbon dioxide to form water-soluble calcium bicarbonate and passing said calcium bicarbonate into the first inverted, frusto-conical tank where it is precipitated on granular contact material by the softening chemical.

12. A process in accordance with claim 9 further comprising treating the precipitate recovered by filtering with a sufficient amount of an inorganic acid to neutralize the precipitate and returning said neutralized solution to said first inverted, frusto-conical tank.

* * * * *